(12) United States Patent
Jakubowski, Jr. et al.

(10) Patent No.: US 6,773,214 B2
(45) Date of Patent: Aug. 10, 2004

(54) SNAP RING RETENTION SYSTEM

(75) Inventors: Thaddeus M. Jakubowski, Jr., St. Charles, MO (US); Cory G. Keller, Fenton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/215,725

(22) Filed: Aug. 7, 2002

(65) Prior Publication Data

US 2004/0028504 A1 Feb. 12, 2004

(51) Int. Cl.$^7$ ................................................ F16B 21/18
(52) U.S. Cl. ...................... 411/353; 411/517; 411/530
(58) Field of Search ............................... 411/353, 516, 411/517, 521, 530

(56) References Cited

U.S. PATENT DOCUMENTS

| | | | | |
|---|---|---|---|---|
| 684,664 A | * | 10/1901 | Anderson | 301/112 |
| 1,711,018 A | * | 4/1929 | Ellis et al. | 411/337 |
| 1,779,204 A | * | 10/1930 | Andersen | 403/274 |
| 2,345,768 A | * | 4/1944 | Nelson | 411/521 |
| 2,450,425 A | * | 10/1948 | Frisby | 411/517 |
| 2,827,925 A | * | 3/1958 | Meibum | 138/44 |
| 2,897,022 A | * | 7/1959 | Marola | 384/584 |
| 3,080,771 A | * | 3/1963 | Baldwin | 74/574 |
| 3,214,204 A | * | 10/1965 | Carter | 403/11 |
| 3,289,726 A | * | 12/1966 | Sauter | 411/105 |
| 3,307,384 A | * | 3/1967 | Sinervo | 70/370 |
| 3,594,024 A | * | 7/1971 | Hertell | 403/262 |
| 3,849,884 A | * | 11/1974 | Arff | 30/383 |
| 3,851,690 A | * | 12/1974 | Wing et al. | 411/190 |
| 4,087,071 A | * | 5/1978 | Parker | 248/406.1 |
| 4,182,579 A | * | 1/1980 | McCormick et al. | 403/326 |
| 4,202,219 A | * | 5/1980 | Weis | 474/223 |
| 4,224,806 A | * | 9/1980 | Kobayashi | 464/111 |
| 4,441,429 A | * | 4/1984 | Price et al. | 102/526 |
| 5,018,898 A | * | 5/1991 | Woodbridge et al. | 403/11 |
| 5,533,849 A | * | 7/1996 | Burdick | 411/120 |

* cited by examiner

*Primary Examiner*—Thomas B. Will
*Assistant Examiner*—Thomas A Beach

(57) ABSTRACT

Snap rings positioned in grooves on shaft members and the like for retaining component members on the shaft members. Retention members, such as retaining rings with counterbores, are positioned over the snap rings and prevent the snap rings from expanding outwardly and being released from the grooves. The retention members are installed such that axial loads force the retention members against the snap rings. The snap rings are preferably spiral snap rings.

7 Claims, 3 Drawing Sheets

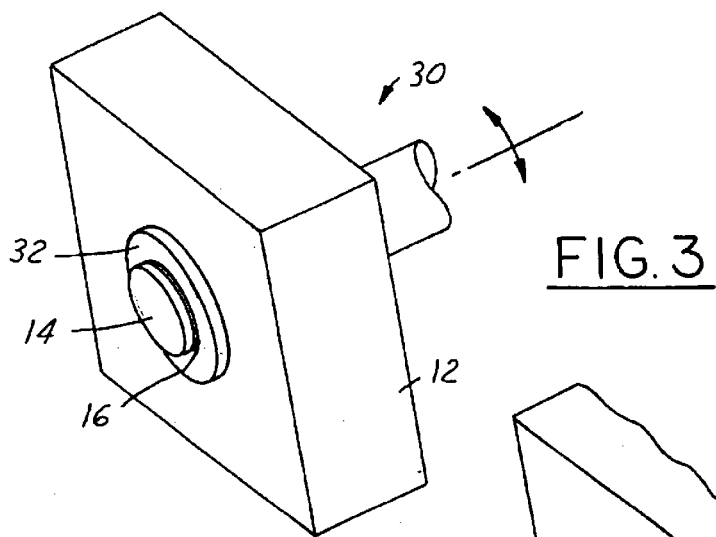
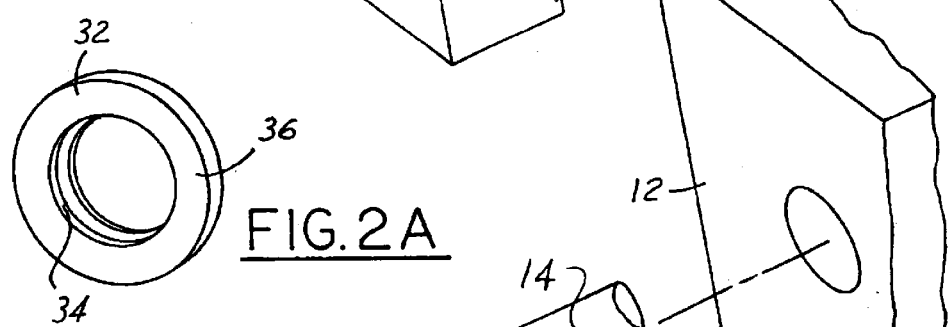
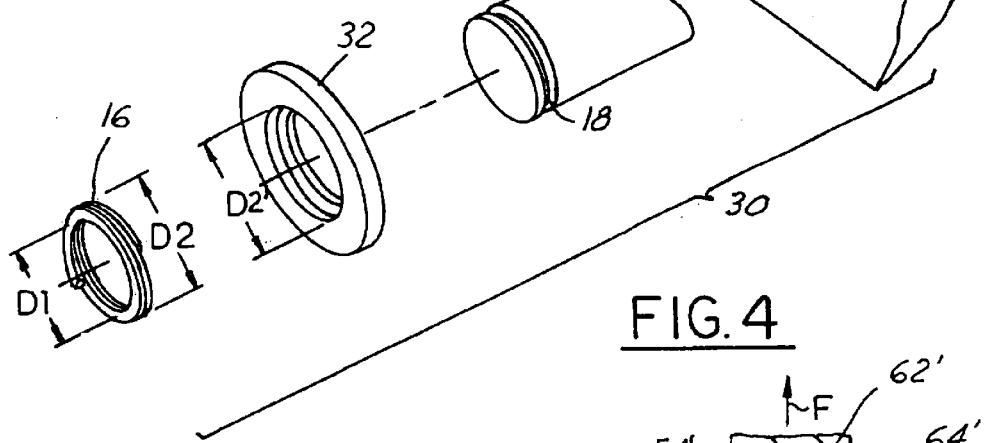
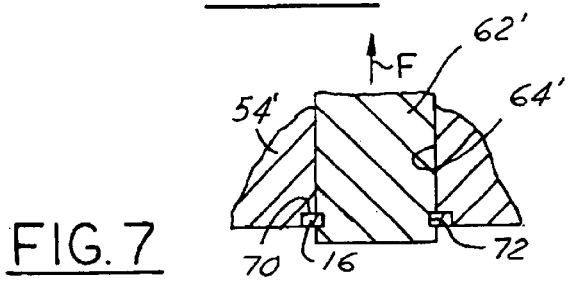

SNAP RING RETENTION SYSTEM

TECHNICAL FIELD

The present invention relates to snap rings and more particularly to retention devices for holding snap rings securely in grooves in shaft members.

BACKGROUND OF THE INVENTION

Snap rings are in common use for many applications today. Snap rings are typically used to attach components or members to shafts or cylindrical-type members. Grooves are machined or provided in the shafts or cylindrical members, and the snap rings are expanded in order to be "snapped" into position in the grooves. With the snap ring in place, components positioned on the shafts or cylindrical members are prevented from being removed therefrom.

Snap rings come in various types and sizes. For example, snap rings can have a "horse shoe" shape with flanges at the open end providing means for installation and removal. The snap rings can also be "spiral" and comprise one or more circular coils which can be expanded in order to allow the snap ring to be installed and/or removed as desired.

Some snap rings, however, have a tendency to disengage and come loose when subjected to high axial and/or rotational loads. This is particularly true when the snap rings are used in environments which are also subjected to high vibration forces. Under high axial and/or rotational loads, spiral snap rings tend to expand outwardly. If the outward expansion is sufficient to allow the snap rings to expand beyond the diameter of the shafts or cylindrical members on which they are positioned, they can be released from their retention grooves. The resulting effects on the operating system is obvious and could be disastrous.

SUMMARY OF THE INVENTION

It is an object of the present invention to provide an improved system and method for retention of snap rings, particularly spiral snap rings, on shafts and other members. It is another object of the present invention to prevent snap rings, such as spiral snap rings, from expanding outwardly beyond the diameter of the shafts or other members.

It is a further object of the present invention to provide an improved method for retaining spiral snap rings on shafts and other members when subjected to high axial and/or rotational loads.

The present invention satisfies the above-stated objects and overcomes the problems with known snap rings, particularly spiral-type snap rings, when subjected to high axial and/or rotational loads. In accordance with the present invention, a retaining ring or member is positioned over the snap ring on the shaft preventing it from expanding under loads. The retaining mechanism is installed such that the direction of the axial loads forces the retaining ring onto the snap ring. The retaining member has a counter-bore diameter on one surface which is sized to the outer diameter of the snap ring.

Once the snap ring is installed into its groove on the shaft or other member, the retaining ring or member is positioned over the snap ring's outer diameter. In this manner, the snap ring is prevented from expansion outwardly and is securely held in position in its groove. The snap ring thus has ability to handle high axial and/or rotational loads without expanding or becoming disengaged from its installation groove.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 2A is a perspective view of a retention ring in accordance with the present invention;

FIG. 3 is a perspective view illustrating a representative use of the present invention;

FIG. 4 is an exploded view depicting the components of the system shown in FIG. 3;

FIG. 7 illustrates an alternate embodiment of the present invention.

DESCRIPTION OF THE PREFERRED EMBODIMENT(S)

Figure 1:
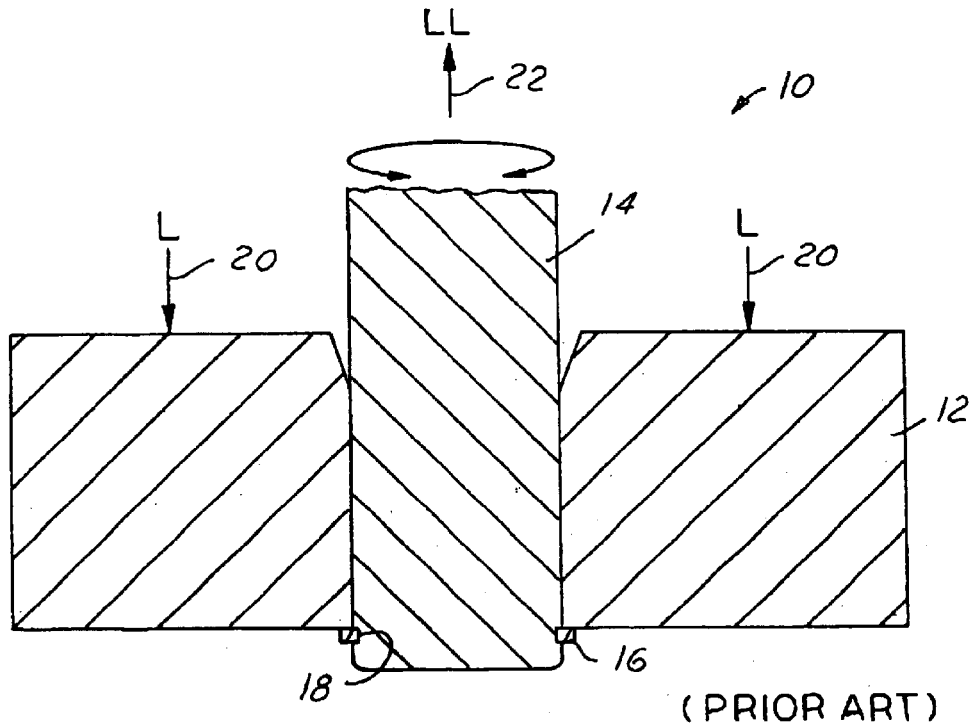
FIG. 1 illustrates a prior art snap ring used to retain a component member on a rotating shaft.

FIG. 1 illustrates the use of a conventional snap ring, such as a spiral snap ring, for retaining a member on a shaft. The prior art system 10 illustrates a component member 12 positioned on a rotating shaft member 14. A snap ring 16, such as a spiral snap ring, is positioned in a groove 18, which is machined on the shaft member 14. The snap ring 16 is installed over the end of the shaft member and into the groove 18 in any conventional manner.

The snap ring 16 holds the component member 12 securely in place on the shaft member 14 and prevents the member 12 from being removed or passing from the end of the shaft member. In many applications, a load L is applied on the component member 12 in the direction of the arrows 20, while at the same time a load LL is being applied in the opposite direction 22 on the rotating shaft member 14. This puts added force on the snap ring.

It has been found that when the snap ring 16 is a spiral snap ring and is subjected to high axial and/or rotational loads, particularly when the loads are combined with vibration forces, the snap rings tend to loosen and become disengaged from the groove 18. In this regard, if the snap ring 16 is released from the shaft member 14 in the system 10 shown in FIG. 1, the component member 12 would slip off the end of the shaft creating a system failure or possible harmful effects on the operator or bystanders.

Figure 2:
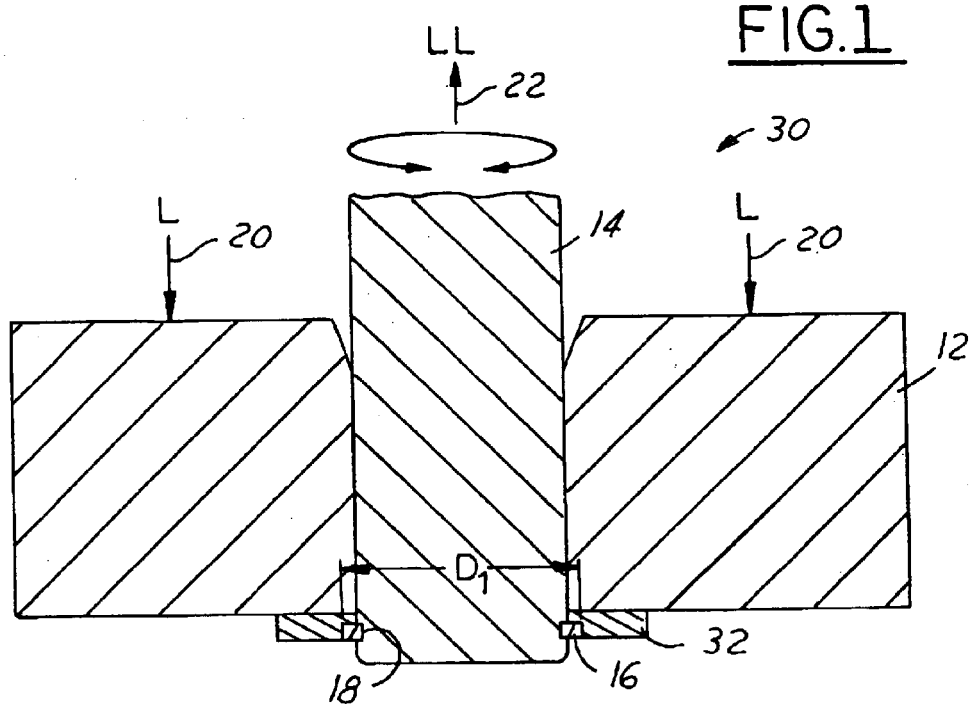
FIG. 2 illustrates a preferred embodiment of the present invention in which a retaining ring is utilized in accordance with the present invention.

A corresponding system 30 in which the present invention can be utilized is shown in FIG. 2. In the system 30, the component member 12 is again retained on a shaft member 14 by a spiral snap ring 16. The snap ring 16 is installed in a groove 18 on a shaft member 14. A retention ring 32 is positioned over the snap ring 16 and adjacent the component member 12. The retaining ring 32, which is better shown in FIG. 2A, has a counter-bored diameter 34 on one side or surface 36. The counterbore 34 is sized specifically to the outer diameter of the spiral snap ring.

In order to assemble the system 30 as shown in FIG. 2, the component member 12 and shaft member 14 are first installed together in the manner shown. Thereafter, the retaining ring 32 is positioned over the end of the shaft member 14 and the spiral snap ring 16 installed thereafter in place in the groove 18. Subsequently, the retaining ring 32 is positioned over the spiral snap ring such that the snap ring 16 fits within the counterbore diameter 34. Then, when the component member 12 is forced against the spiral snap ring due to high axial loads or rotational loads, the retaining ring 32 holds the spiral snap ring 16 in place and prevents it from expanding outwardly and being released from the groove 18.

A perspective view of the system 30 is shown in FIG. 3. An exploded view of the components of the system 30 is shown in FIG. 4. As shown, the spiral snap rings 16 are circular in shape, having a certain inner diameter D1 and a certain outer diameter D2. Spiral snap rings are typically made from steel wire which is bent into a spiral shape. The groove 18 on the shaft member 14, which also could be any type of cylindrical member, is machined to correspond precisely to the inner diameter D1 of the snap ring 16. Also, the diameter D2' of the counterbore diameter 34 in the retaining ring 32 is sized to fit precisely over the outer diameter D2 of the snap ring 16.

The outer peripheral shape of the retaining ring 32 can be of any size and shape. A circular disc-like shape is shown in FIGS. 3 and 4, although it is understood that the retaining ring could have a square shape, any polygon-type outer shape and perimeter, etc. Similarly, the component member 12 can be any type of component or member which can be mounted on a shaft or other cylindrical member. For example, the component member 12 could be a gear member or a wheel.

Figure 5:
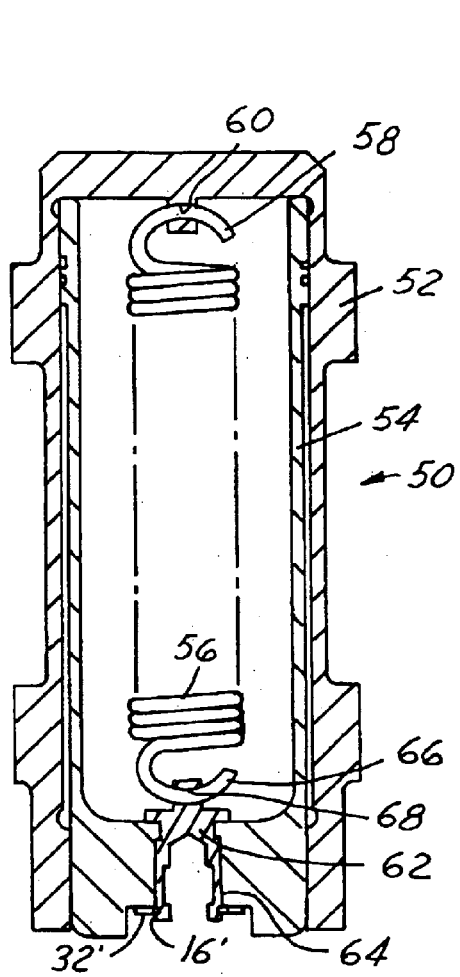
FIGS. 5 and 6 illustrate a preferred use of the present invention.
Figure 6:
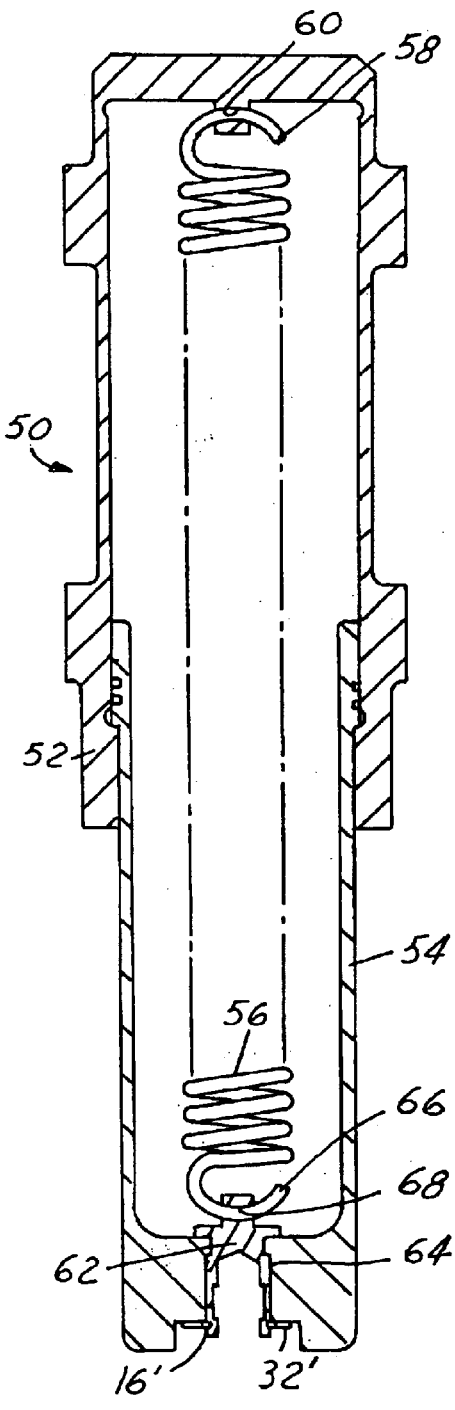

A preferred use of the present invention is shown in FIGS. 5 and 6. In these Figures, the snap ring 16 and retaining ring 32 are installed on a bomb rack ejector piston mechanism 50. The piston mechanism 50 has an outer housing member 52 and an inner member 54 which are telescopically positioned together. A spring member 56, such as a coil spring, is used to bias the two housing members 52 and 54 relative to the other. In this regard, one end 58 of the spring member 56 is positioned through opening 60 at one end of the piston housing 52. A post retention member 62 is positioned in opening 64 at one end of the inner housing member 54. The opposite end 66 of the spring member 56 is positioned in opening 68 in the post member 62.

Figure 5A:
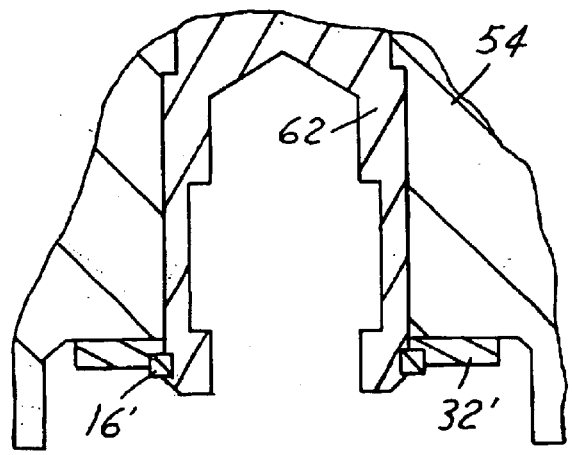
FIG. 5A is an enlarged view of a portion of FIG. 5.

The outer end of the post member 62 is held in place in the inner housing member 54 by use of a spiral snap ring 16' and a retaining ring 32'. This is particularly shown in FIG. 5A.

When the bomb rack ejector piston mechanism 50 is activated (i.e. filled with a pressurized gas), the spring member 56 is elongated creating axial forces on the retaining ring 32' and spiral snap ring 16'. This is shown in FIG. 6. Ejector mechanisms and systems with which the present invention could be utilized as shown, for example, in U.S. Pat. Nos. 5,029,776 and 5,583,312, the disclosures of which are being incorporated herein by reference.

FIG. 7 illustrates an alternate embodiment of the present invention. In this embodiment, a retention groove or recess 70 is formed (e.g. machined) in the end of the inner housing member 54', and a corresponding groove 72 is provided adjacent the end of the post member 62'. A spiral snap ring 16 is installed on the end of the post member 62', as shown. The post member is positioned in the opening 64' in the housing member 54' and held in place by the axial load force F of a biasing (spring) member (not shown). The groove 70 acts as a retention mechanism for preventing the spiral snap ring 16 from expanding and possibly slipping off the end of the post member 62'. This embodiment has particular use wherever there is a constant axial load force acting on the snap ring member.

Although particular uses of the present invention are illustrated in FIGS. 5–7, it is obvious that the present invention can be used in virtually any application in which a snap ring is used to retain a component member on a shaft or other cylindrical member. In this regard, the present invention has particular use in applications where significant axial and/or rotational loads (with or without additional vibration forces) are applied to the snap rings. The counterbore or recess in the retainer ring member or component member (e.g. post member) is sized and shaped to fit the external perimeter of the snap ring member. Thereafter, when the snap ring and retention member mechanism are mounted on a shaft member, any axial force or rotational load applied against the snap ring will act on the retention mechanism and prevent the snap ring from enlarging and possibly becoming disengaged from the shaft.

It is also to be understood that the present invention is not limited to the precise type of snap ring and environments shown and described herein. Any type of shaft member or retention member can be used with the present invention and the component member can be any type of structure or device which needs to be retained on a shaft or cylindrical member. The present invention can further be used in all situations and is not limited to use only in situations where the axial and rotational loads are substantial or where there is a high likelihood of release of the snap ring from a shaft member.

The present invention can also be used with any type of shafts, component members, snap rings, retaining rings and retention members which are made of any material. It is preferred, however, that the snap rings, retaining rings, and retention members be made of a metal material, such as steel, although it is understood that other comparable materials which meet the objects and purposes of the present invention could be utilized.

While particular embodiments of the invention have been shown and described, numerous variations and alternative embodiments will occur to those skilled in the art. Accordingly, it is intended that the invention be limited only in terms of the appended claims.

What is claimed is:

1. A snap-ring retention system comprising;
    a first member and a second member positioned adjacent each other for relative axial movement;
    a post member positioned in one of said first or second members;
    a biasing member connected at one end to said post member and at the other end to one of said first and second members;
    said biasing member biasing said first member and second member in an axial direction toward one another;
    said post member having a circumferential groove thereon;
    a snap ring member; and
    a retention member having a recess therein;
    said snap ring member being positioned partially in said circumferential groove and partially in said recess;
    wherein said biasing force from said biasing member places an axial force on said post member and snap ring member, and wherein said retention member prevents said snap ring member from being removed from said circumferential groove.

2. The snap-ring retention system as described in claim 1 wherein said first member comprises a housing with a first internal cavity and said second member comprises a housing with a second internal cavity.

3. The snap-ring retention system as described in claim 2 wherein said first and second members are telescopingly positioned together.

4. The snap-ring retention system as described in claim 1 wherein said biasing member is a coil spring member.

5. The snap-ring retention system as described in claim 1 wherein said retention member is a retention ring member.

6. The snap-ring system as described in claim 1 wherein said snap ring member is a spiral snap ring member.

7. The snap-ring system as described in claim 1 wherein said biasing member is connected to a first end of said post member and said circumferential groove is positioned adjacent a second end of said post member.

* * * * *